United States Patent
Kikuchi

(10) Patent No.: US 10,535,464 B2
(45) Date of Patent: Jan. 14, 2020

(54) FILM CAPACITOR, COMBINATION TYPE CAPACITOR, AND INVERTER AND ELECTRIC VEHICLE USING THE SAME

(71) Applicant: KYOCERA Corporation, Kyoto-shi, Kyoto (JP)

(72) Inventor: Naoki Kikuchi, Kirishima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/082,749

(22) PCT Filed: Mar. 14, 2017

(86) PCT No.: PCT/JP2017/010170
§ 371 (c)(1),
(2) Date: Sep. 6, 2018

(87) PCT Pub. No.: WO2017/159672
PCT Pub. Date: Sep. 21, 2017

(65) Prior Publication Data
US 2019/0122819 A1    Apr. 25, 2019

(30) Foreign Application Priority Data
Mar. 14, 2016 (JP) .................................. 2016-049752

(51) Int. Cl.
*H01G 4/005* (2006.01)
*H01G 4/015* (2006.01)
(Continued)

(52) U.S. Cl.
CPC ............. *H01G 4/015* (2013.01); *B60L 50/51* (2019.02); *H01G 4/012* (2013.01); *H01G 4/18* (2013.01); *H01G 4/32* (2013.01); *H02M 7/48* (2013.01)

(58) Field of Classification Search
CPC ........ B60L 50/51; H01G 4/012; H01G 4/015; H01G 4/18; H01G 4/32; H01G 4/38; Y02T 10/7022
See application file for complete search history.

(56) References Cited

U.S. PATENT DOCUMENTS

| | | | |
|---|---|---|---|
| 2015/0116904 A1 | 4/2015 | Takeoka et al. | |
| 2015/0380167 A1* | 12/2015 | Lim | H01G 4/30 361/301.4 |
| 2016/0372264 A1* | 12/2016 | Maeda | H01G 4/18 |

FOREIGN PATENT DOCUMENTS

| | | |
|---|---|---|
| CN | 104364860 A | 2/2015 |
| JP | 06-2267786 A | 9/1994 |

(Continued)

*Primary Examiner* — Muhammad S Islam
(74) *Attorney, Agent, or Firm* — Volpe and Koenig, P.C.

(57) ABSTRACT

A film capacitor includes a main body portion including a dielectric film, and a first metal film and a second metal film on the dielectric film; and a first external electrode and a second external electrode which are respectively disposed at opposing ends of the main body portion. The first metal film and the second metal film each include a first portion, a second portion and a third portion. The third portion is located between the first portion and the second portion. The third portion of the first metal film is divided by a first groove extending in a first direction, and the third portion of the second metal film is divided by a second groove extending in a second direction. The first direction and the second direction intersect each other in a plan view of the film capacitor.

10 Claims, 12 Drawing Sheets

(51) Int. Cl.
 *B60L 50/51* (2019.01)
 *H01G 4/18* (2006.01)
 *H02M 7/48* (2007.01)
 *H01G 4/32* (2006.01)
 *H01G 4/012* (2006.01)

(56) References Cited

FOREIGN PATENT DOCUMENTS

| JP | 2007-053222 A | 3/2007 |
| JP | 2009-164328 A | 7/2009 |
| JP | 2015-056582 A | 3/2015 |

* cited by examiner

FILM CAPACITOR, COMBINATION TYPE CAPACITOR, AND INVERTER AND ELECTRIC VEHICLE USING THE SAME

TECHNICAL FIELD

The present disclosure relates to a film capacitor, a combination type capacitor, and an inverter and an electric vehicle using the same.

BACKGROUND ART

The film capacitor has, for example, a dielectric film obtained by forming a polypropylene resin into a film, and a metal film formed on a surface of the dielectric film by vapor deposition. The metal film is used as an electrode. With such a configuration, the film capacitor has an advantage that even when short-circuiting occurs in an insulation defect portion of the dielectric film, the metal film around the defect portion evaporates and scatters due to a short circuit energy, and the insulation defect portion is insulated, so that dielectric breakdown of the film capacitor can be prevented (self-recovery property).

In this manner, the film capacitor can prevent ignition and electric shock when an electric circuit is short-circuited. Focusing on this point, recently, the film capacitor has been applied to a power supply circuit such as LED (Light Emitting Diode) lighting and the like, and applications are expanding to motor drive of hybrid cars, an inverter system for solar power generation, and the like.

In the film capacitor, when the self-recovery property functions as described above, the metal film around the insulation defect portion evaporates and scatters for insulation. As a result, an area of the electrode for generating electrostatic capacitance is reduced and a capacitance of the film capacitor is reduced. In order to suppress reduction in capacitance after self-recovery, a film capacitor in which a deposition electrode in the vicinity of an insulation margin portion is divided into a plurality of small regions and these regions are connected in parallel by fuses is disclosed (see, for example, Patent Literature 1). In the film capacitor having such a structure, when the self-recovery property functions, the fuse is blown and the region having the defect portion can be separated from the electric circuit.

CITATION LIST

Patent Literature

Patent Literature 1: Japanese Unexamined Patent Publication JP-A 2009-164328

SUMMARY OF INVENTION

A film capacitor of the present disclosure includes: a main body portion including a dielectric film, and a first metal film and a second metal film which are respectively disposed on opposing first and second surfaces of the dielectric film; and a first external electrode and a second external electrode which are respectively disposed at opposing first and second ends of the main body portion. The first metal film and the second metal film each include a first portion, a second portion and a third portion. The first portion of the first metal film is connected to the first external electrode at the first end, the second portion of the first metal film is located at the second end, and the third portion of the first metal film is located between the first portion and the second portion of the first metal film. The third portion of the first metal film includes a plurality of first divided regions which are divided by a first groove extending in a first direction. The first portion of the second metal film is connected to the second external electrode at the second end, the second portion of the second metal film is located at the first end, and the third portion of the second metal film is located between the first portion and the second portion of the second metal film. The third portion of the second metal film includes a plurality of second divided regions which are divided by a second groove extending in a second direction. The first direction and the second direction intersect each other in a plan view of the film capacitor.

A combination type capacitor of the present disclosure includes a plurality of film capacitors and at least one bus bar connecting all of the plurality of film capacitors, the film capacitor including the above-described film capacitor.

An inverter of the present disclosure includes a bridge circuit including switching elements and a capacitance member connected to the bridge circuit, the capacitance member including the above-described film capacitor or the above-described combination type capacitor.

An electric vehicle of the present disclosure includes a power supply, an inverter connected to the power supply, a motor connected to the inverter, and a wheel driven by the motor, the inverter including the above-described inverter.

BRIEF DESCRIPTION OF DRAWINGS

FIGS. 3A and 3B show a part of a dielectric film and a metal film, wherein FIG. 3A is a plan view of a surface, and FIG. 3B is a transverse cross-sectional view;

FIGS. 5A and 5B are views showing an arrangement in which a first metal film-attached film and a second metal film-attached film are overlapped with each other, wherein FIG. 5A is a plan view of the first metal film-attached film, and FIG. 5B is a plan view of the second metal film-attached film;

FIGS. 7A to 7C are views showing an arrangement in which the first metal film-attached film and the second metal film-attached film are laminated, wherein FIG. 7A is an enlarged plan view of a broken line portion of FIG. 5A, FIG. 7B is an enlarged plan view of a broken line portion of FIG. 5B, and FIG. 7C is a view obtained by overlapping third portions;

FIGS. 8A to 8C are enlarged views of portions indicated by broken line portions of FIGS. 5A and 5B of a surface of a metal film-attached film in another embodiment, wherein FIG. 8A is a plan view of one metal film-attached film, FIG. 8B is a plan view of the other metal film-attached film, and FIG. 8C is a view obtained by overlapping the third portions;

FIGS. 9A to 9C are enlarged views of portions indicated by the broken line portions of FIGS. 5A and 5B of the surface of the metal film-attached film in still another embodiment, wherein FIG. 9A is a plan view of the first metal film-attached film, FIG. 9B is a plan view of the second metal film-attached film, and FIG. 9C is a view obtained by overlapping the third portions;

FIGS. 13A and 13B are views showing a conventional film capacitor, wherein FIG. 13A is a transverse cross-sectional view in which a set of metal film-attached films are overlapped, and FIG. 13B is a plan view showing an arrangement of the set of metal film-attached films.

DESCRIPTION OF EMBODIMENTS

Figure 1:
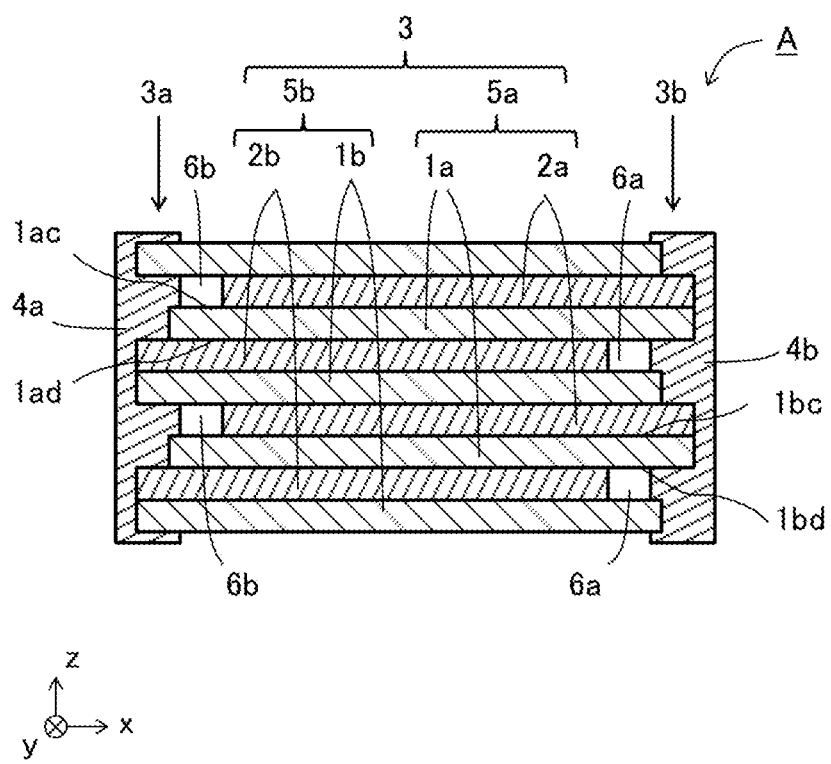
FIG. 1 is a schematic cross-sectional view of a laminated type film capacitor.
Figure 2:
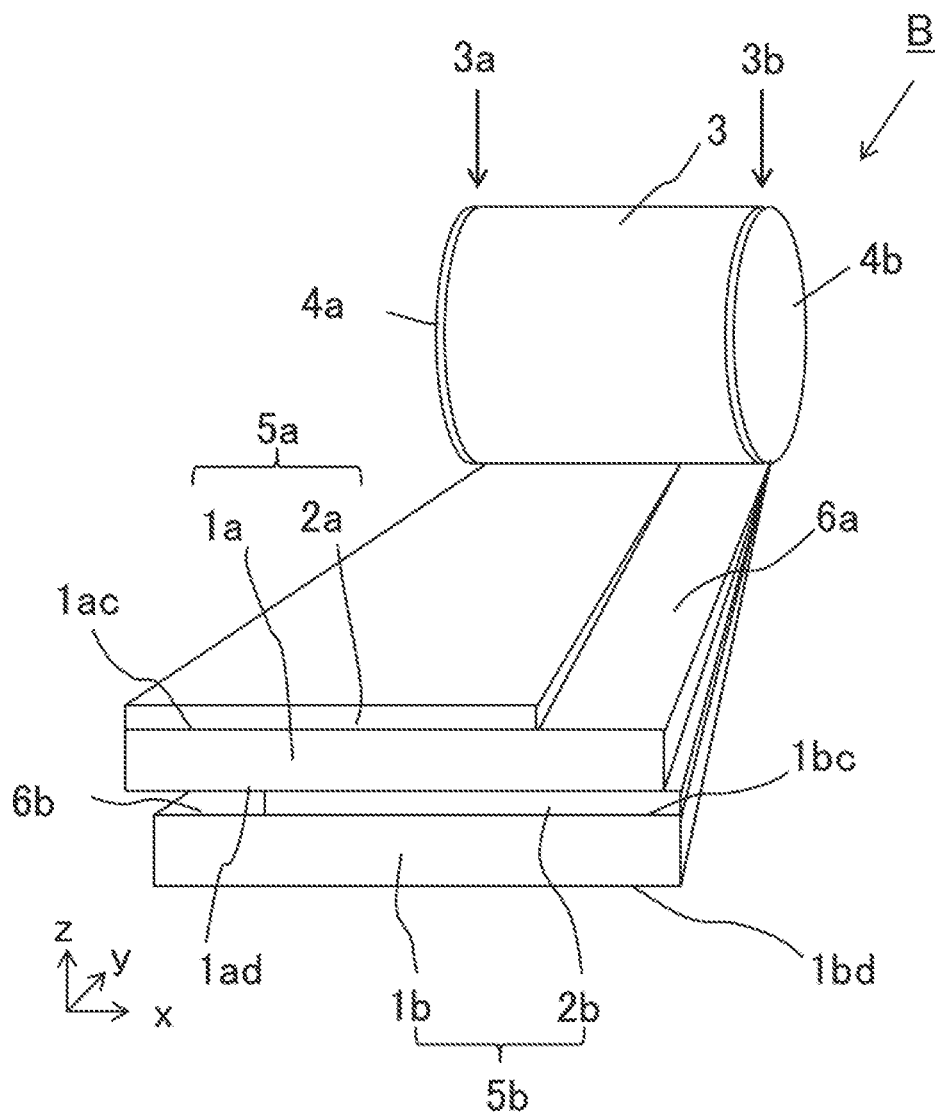
FIG. 2 is an exploded perspective view schematically showing a structure of a wound type film capacitor.

As shown in FIGS. 1 and 2, the film capacitor includes a film capacitor main body portion 3 (hereinafter also referred to simply as a "main body portion 3") in which dielectric films 1a and 1b and metal films 2a and 2b are laminated or wound, and a pair of external electrodes 4a and 4b disposed at opposing ends of the main body portion 3 by metal spraying.

In the main body portion 3 of a laminated type film capacitor A shown in FIG. 1, a metal film-attached film 5a provided with a metal film 2a on a first surface 1ac of a dielectric film 1a, and a metal film-attached film 5b provided with a metal film 2b on a first surface 1bc of a dielectric film 1b are alternately laminated. The metal film 2a is electrically connected to the external electrode 4a at one end 3a of the main body portion 3. The metal film 2b is electrically connected to the external electrode 4b at the other end 3b of the main body portion 3.

In FIG. 1, a width direction of the dielectric films 1a and 1b and the metal films 2a and 2b is indicated as an x direction, a length direction thereof is indicated as a y direction, and a thickness direction thereof is indicated as a z direction. Therefore, the dielectric films 1a and 1b and the metal films 2a and 2b are overlapped in the z direction, and the external electrodes 4a and 4b are respectively disposed at the ends 3a and 3b located in the x direction of the main body portion 3.

In the main body portion 3 of a wound type film capacitor B shown in FIG. 2, the metal film-attached film 5a provided with the metal film 2a on the first surface 1ac of the dielectric film 1a, and the metal film-attached film 5b provided with the metal film 2b on the first surface 1bc of the dielectric film 1b are laminated and then wound. The metal film 2a is electrically connected to the external electrode 4a at the one end 3a of the main body portion 3. The metal film 2b is electrically connected to the external electrode 4b at the other end 3b of the main body portion 3.

In FIG. 2, in order to facilitate understanding, thicknesses of the dielectric films 1a and 1b and the metal films 2a and 2b which are drawn out are drawn to be thicker as they go forward in the drawing sheet.

In FIG. 2, the width direction of the dielectric films 1a and 1b and the metal films 2a and 2b is indicated as the x direction, the length direction thereof is indicated as the y direction, and the thickness direction thereof is indicated as the z direction. Therefore, the dielectric films 1a and 1b and the metal films 2a and 2b are laminated in the z direction, and the external electrodes 4a and 4b are respectively disposed at the ends 3a and 3b located in the x direction of the main body portion 3. In the film capacitor B, the x direction is the same as an axial direction of winding.

The dielectric film 1a of the film capacitors A and B has the first surface 1ac and the second surface 1ad which are opposed to each other, and the dielectric film 1b thereof has the first surface 1bc and the second surface 1bd which are opposed to each other. The metal film-attached film 5a is a film in which the metal film 2a is formed on the first surface 1ac of the dielectric film 1a, and has a so-called insulation margin portion 6a in which the dielectric film 1a is exposed on a part of the first surface 1ac. The metal film-attached film 5b is a film in which the metal film 2b is formed on the first surface 1bc of the dielectric film 1b, and has a so-called insulation margin portion 6b in which the dielectric film 1b is exposed on a part of the first surface 1bc. As shown in FIGS. 1 and 2, these metal film-attached films 5a and 5b are laminated or wound in a state slightly shifted in the width direction (x direction).

In this manner, in the film capacitors A and B, the metal film-attached film 5a including the dielectric film 1a and the metal film 2a and the metal film-attached film 5b including the dielectric film 1b and the metal film 2b are overlapped and laminated or wound as shown in FIGS. 1 and 2.

The metal films 2a and 2b are respectively connected to the external electrodes 4a and 4b at connecting portions exposed at the ends 3a and 3b located in the x direction of the main body portion 3.

Figure 3A:
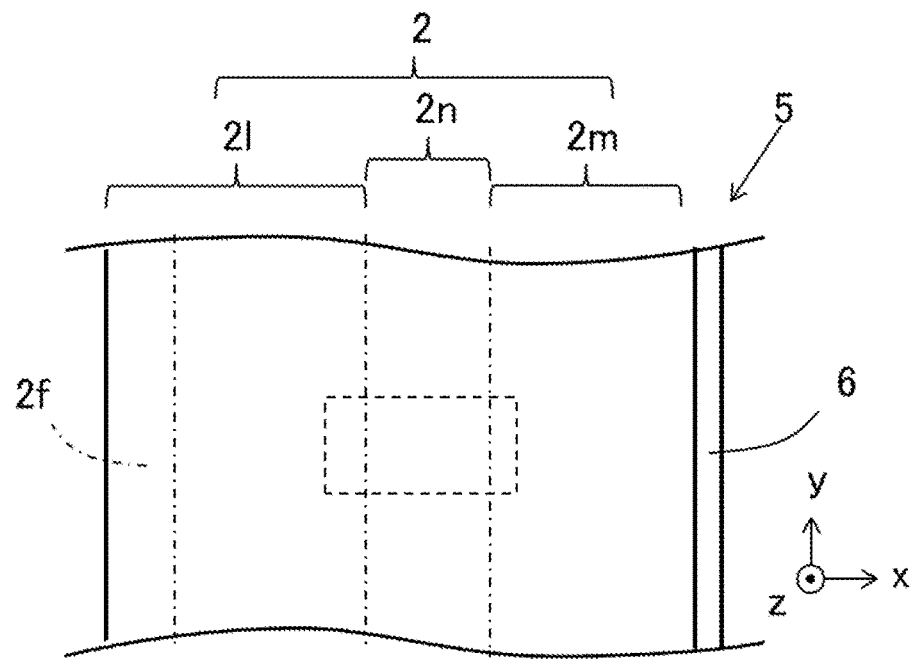
Figure 3B:
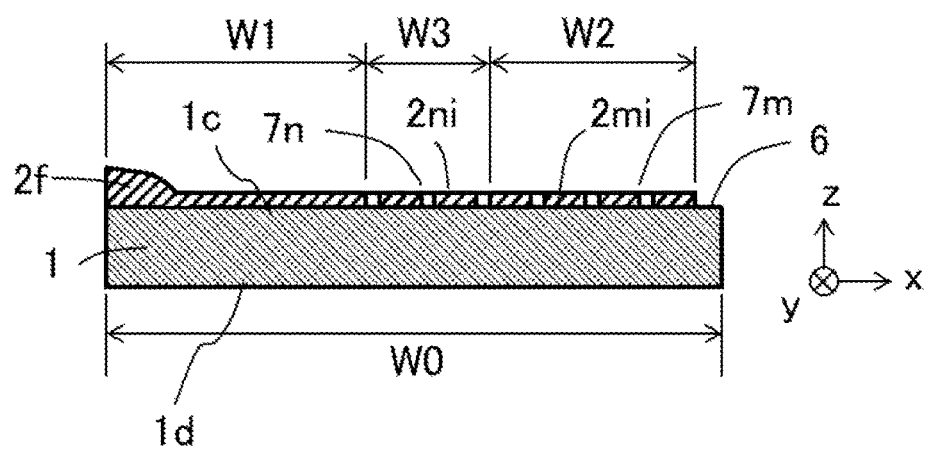

In order to explain features of the present embodiment common to the metal film-attached films 5a and 5b, in the following, reference numerals a and b may be omitted as shown in FIGS. 3A and 3B. Further, in a transverse cross-sectional view of FIG. 3B, the thickness direction (z direction) of the film is enlarged in order to facilitate understanding.

In the present embodiment, as shown in FIGS. 3A and 3B, the metal film 2 includes a first portion 2l, a second portion 2m, and a third portion 2n. The first portion 2l is located on a left end (first end) side and is connected to a first external electrode 4 (not shown). The second portion 2m is located in the vicinity of a right end (second end), that is, in the vicinity of the insulation margin portion 6, and is not connected to a second external electrode 4. The third portion 2n is located between the first portion 2l and the second portion 2m in the x direction. In the metal film 2, the first portion 2l and the second portion 2m are respectively disposed at both ends in the x direction, and the third portion 2n is sandwiched between the first portion 2l and the second portion 2m.

Figure 4:
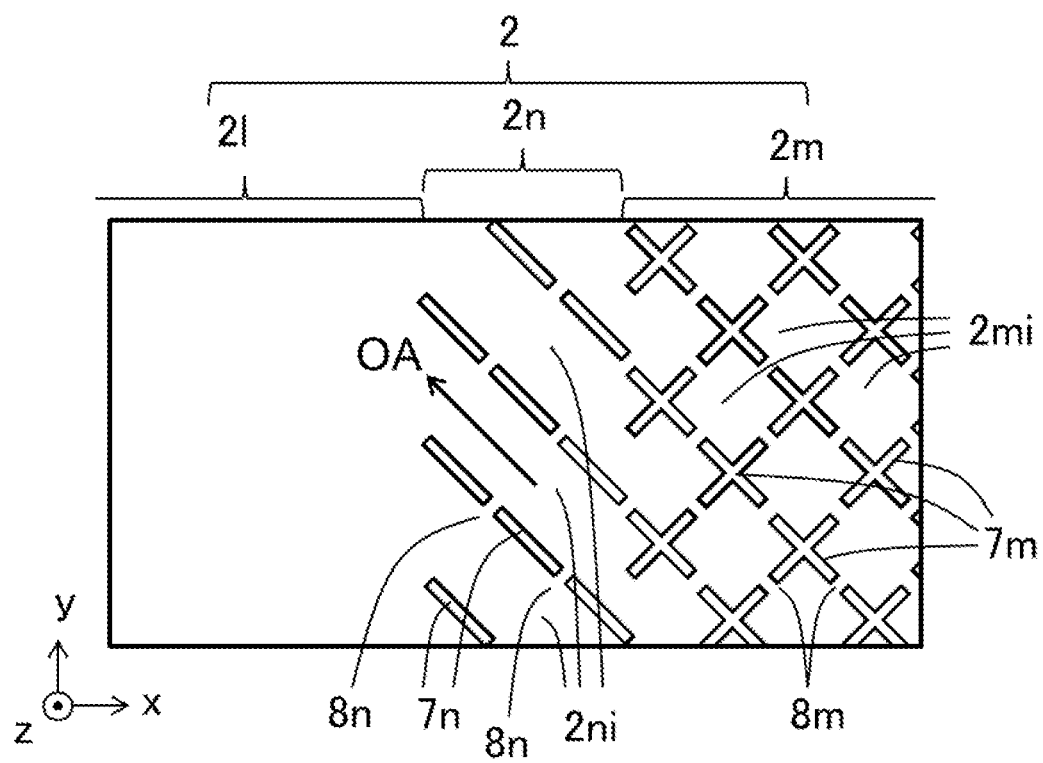
FIG. 4 is an enlarged plan view of a part (broken line portion) of FIG. 3A.

As shown in FIG. 4, a plurality of grooves 7n are formed at a predetermined interval in the third portion 2n. That is, the third portion 2n has a plurality of divided regions 2ni which are divided by the grooves 7n. The groove 7n extends in a first direction OA or a second direction OB (not shown) on the metal film 2. The third portion 2n may further include a fuse portion 8n connecting divided regions 2ni adjacent to each other. The groove 7n can be formed by laser processing.

A boundary between the third portion 2n and the first portion 2l is a line connecting ends on the first portion 2l side of the grooves 7n in the y direction, and a boundary between the third portion 2n and the second portion 2m is a line connecting ends on the second portion 2m side of the grooves 7n in the y direction. At the boundary between the first portion 2l and the third portion 2n, the divided region 2ni adjacent to the first portion 2l and the first portion 2l are continuous. Further, at the boundary between the second portion 2m and the third portion 2n, the divided region 2ni adjacent to the second portion 2m and the second portion 2m are continuous.

FIGS. 5A to 7C show an arrangement when the metal film-attached films 5a and 5b are overlapped. The metal film-attached film 5a shown in FIG. 5A and the metal film-attached film 5b shown in FIG. 5B are overlapped with each other slightly shifted in the width direction (x direction). The metal film-attached films 5a and 5b are disposed so that the first portion 2la of the metal film 2a overlaps the second portion 2mb of the metal film 2b and the second portion 2ma of the metal film 2a overlaps the first portion 2lb of the metal film 2b.

Figure 6:
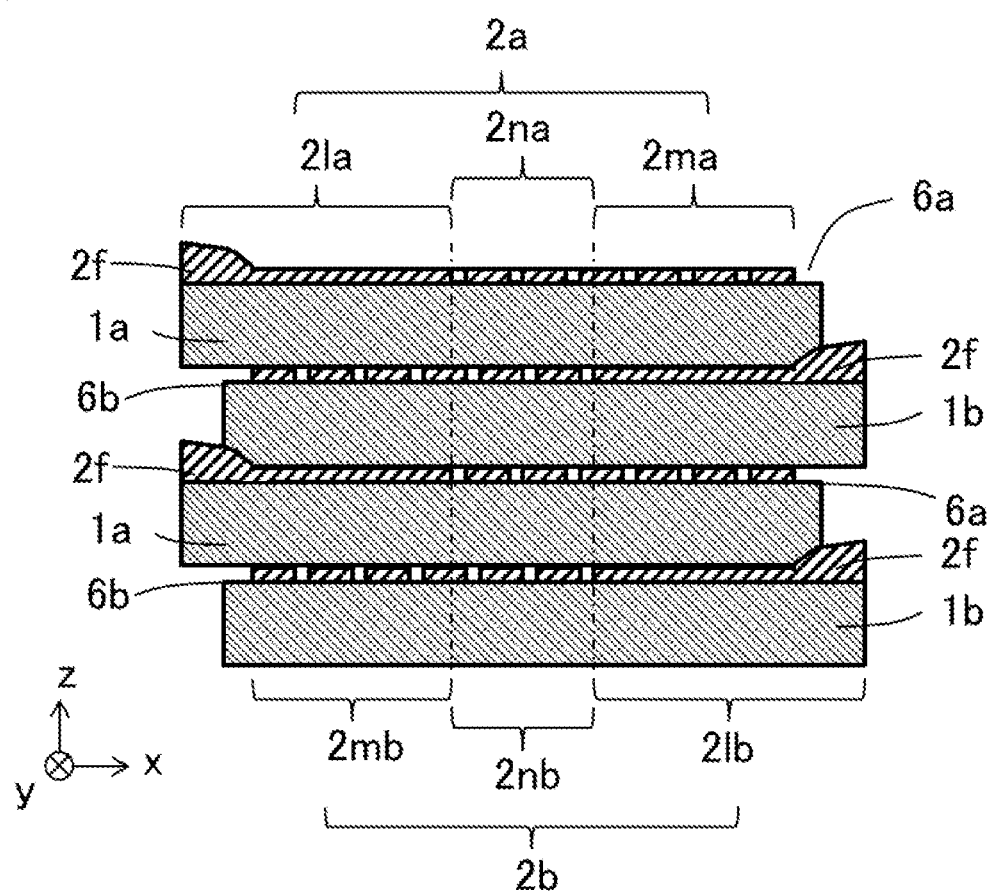
FIG. 6 is a transverse cross-sectional view showing a part of a main body portion in which the first metal film-attached film and the second metal film-attached film are laminated or wound.

In the film capacitors A and B, the metal film-attached films 5a and 5b are overlapped with each other in such an arrangement, and are laminated or wound. FIG. 6 shows a part of a cross-section of the film capacitors A and B. A pair of metal film-attached films 5a and 5b are overlapped, and laminated or wound so that the dielectric film 1a, the metal film 2a, the dielectric film 1b, and the metal film 2b are overlapped in plural in this order.

Figure 5A:
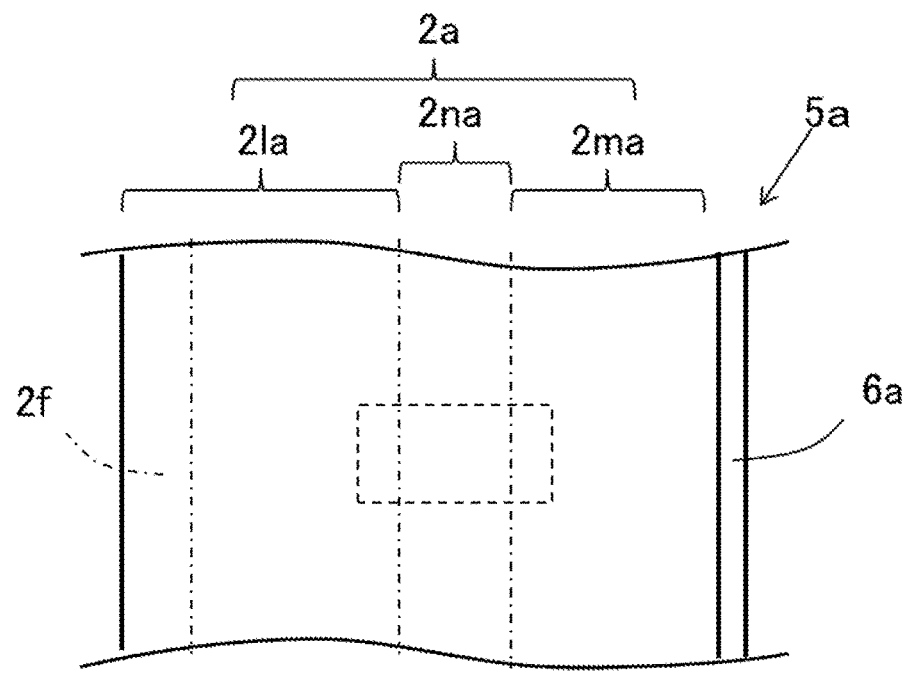
Figure 7A:
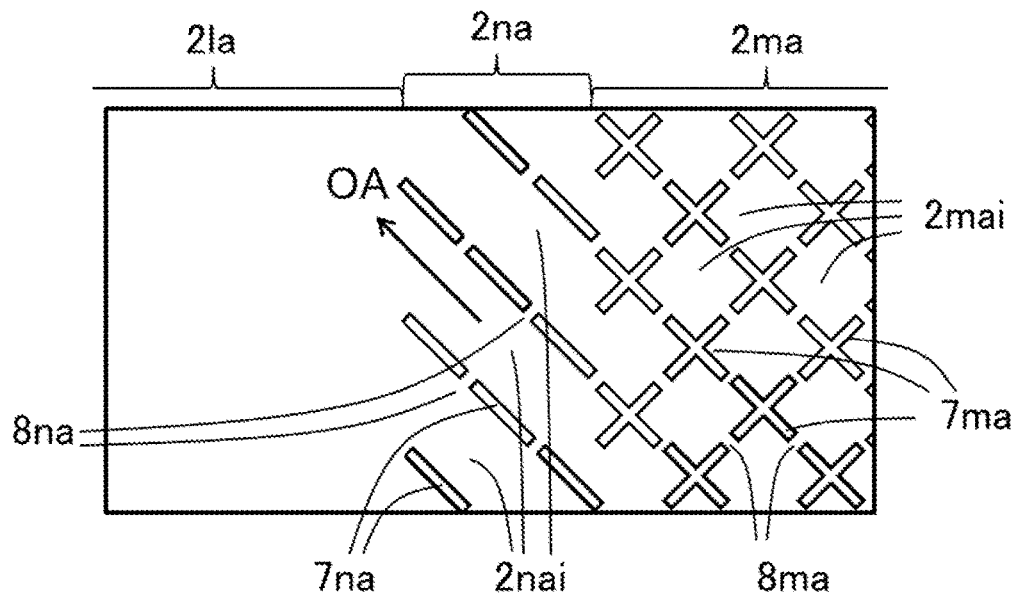
Figure 7B:
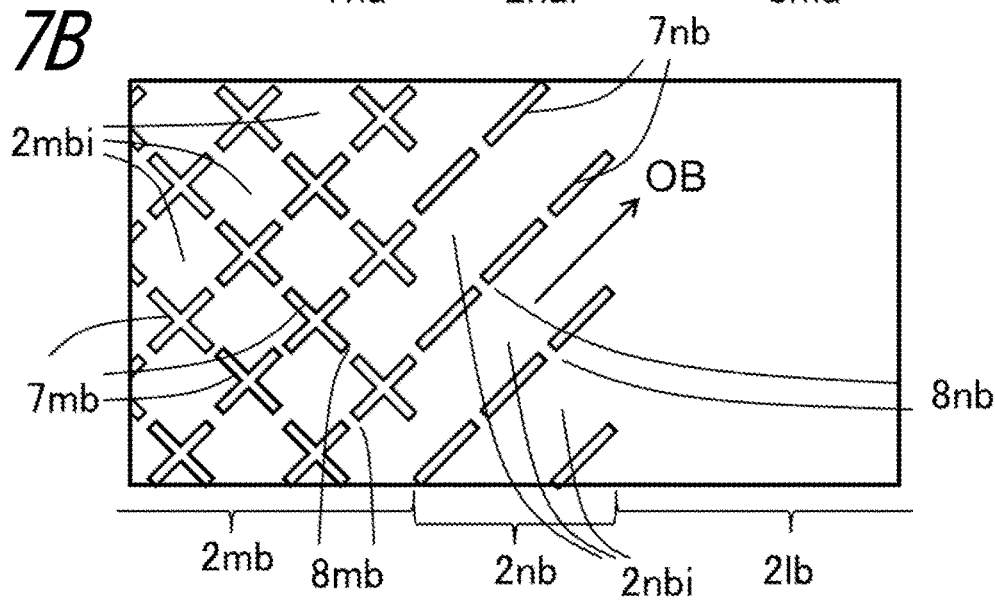

FIG. 7A is an enlarged view of a broken line portion of FIG. 5A. A third portion 2na of the metal film 2a shown in FIG. 7A has a plurality of first divided regions 2nai which are divided by first grooves 7na. The first groove 7na extends in the first direction OA on the metal film 2a. FIG. 7B is an enlarged view of a broken line portion of FIG. 5B. A third portion 2nb of the metal film-attached film 5b shown in FIG. 7B has a plurality of second divided regions 2nbi which are divided by second grooves 7nb. The second groove 7nb extends in the second direction OB on the metal film 2b.

Figure 7C:
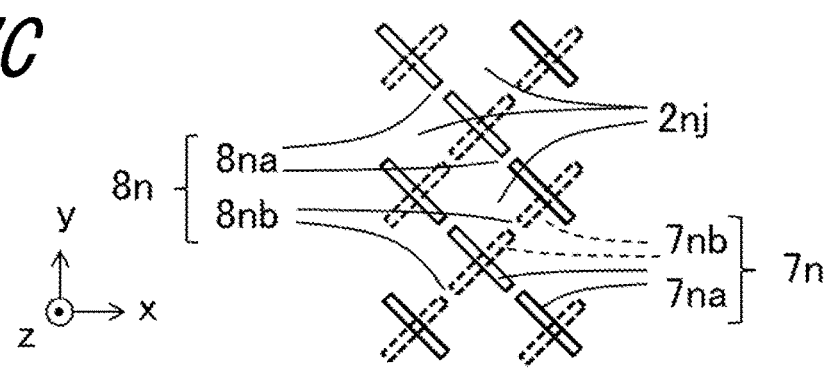

The first direction OA and the second direction OB intersect each other. Further, the third portions 2na and 2nb are disposed to face each other with the dielectric film 1 interposed therebetween. In this manner, the third portion 2na having the first groove 7na extending in the first direction OA and the third portion 2nb having the second groove 7nb extending in the second direction OB are disposed to face each other with the dielectric film 1 interposed therebetween. Thus, the first groove 7na and the second groove 7nb are overlapped with each other, and the first groove 7na and the second groove 7nb intersect each other with the dielectric film 1 therebetween. As a result, the first divided region 2nai and the second division region 2nbi are overlapped in the third portion 2n. As a result, as shown in FIG. 7C, the first groove 7na (solid line) and the second groove 7nb (broken line) intersect each other with the dielectric film 1 or 2 therebetween, and further divided regions 2nj are formed.

In other words, the first metal film 2a disposed on the first surface 1c of the dielectric film 1 and the second metal film 2b disposed on the second surface 1d respectively have the first portion 2l, the second portion 2m, and the third portion 2n. The first portion 2la of the first metal film 2a is connected to the first external electrode 4a at the first end 3a of the main body portion 3, and the second portion 2ma is disposed in the vicinity of the second end 3b. The third portion 2na of the first metal film 2a is located between the first portion 2la and the second portion 2ma in the x direction. The first portion 2lb of the second metal film 2b is connected to the second external electrode 4b at the second end 3b of the main body portion 3, and the second portion 2mb is disposed in the vicinity of the first end 3a. The third portion 2na of the second metal film 2b is located between the first portion 2lb and the second portion 2mb in the x direction.

The first portion 2la of the first metal film 2a and the second portion 2mb of the second metal film 2b are overlapped with the dielectric film 1 interposed therebetween, and the second portion 2ma of the first metal film 2a and the first portion 2lb of the second metal film 2b are overlapped with the dielectric film 1 interposed therebetween.

The third portion 2na of the first metal film 2a and the third portion 2nb of the second metal film 2b are overlapped with the dielectric film 1 interposed therebetween. The third portion 2na of the first metal film 2a has a plurality of first divided regions 2nai which are divided by the first grooves 7na extending in the first direction OA, and the third portion 2nb of the second metal film 2b has a plurality of second divided regions 2nbi which are divided by the second grooves 7nb extending in the second direction OB. The first direction OA and the second direction OB intersect each other, and when the dielectric film 1, the first metal film 2a, and the second metal film 2b are viewed in a plan view, the first groove 7na (solid line) and the second groove 7nb (broken line) intersect each other. Thus, further divided regions 2nj are formed in the third portion 2n.

Figure 13A:
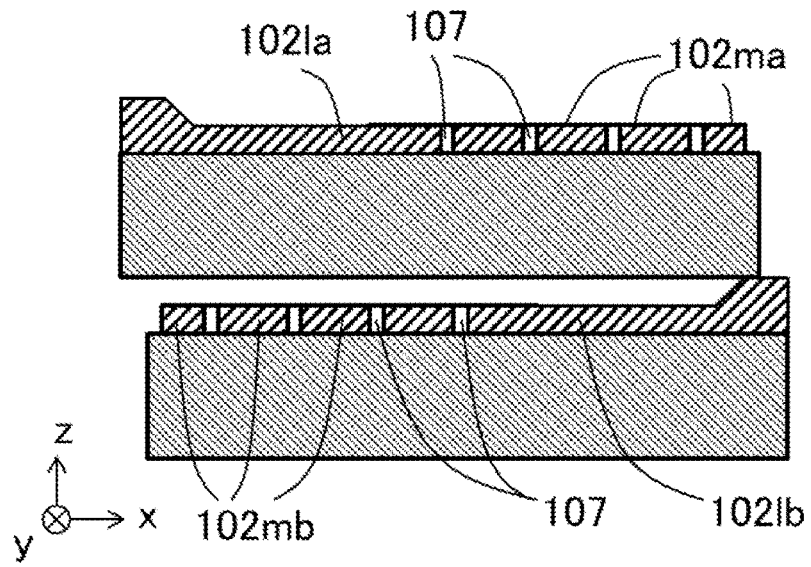
Figure 13B:
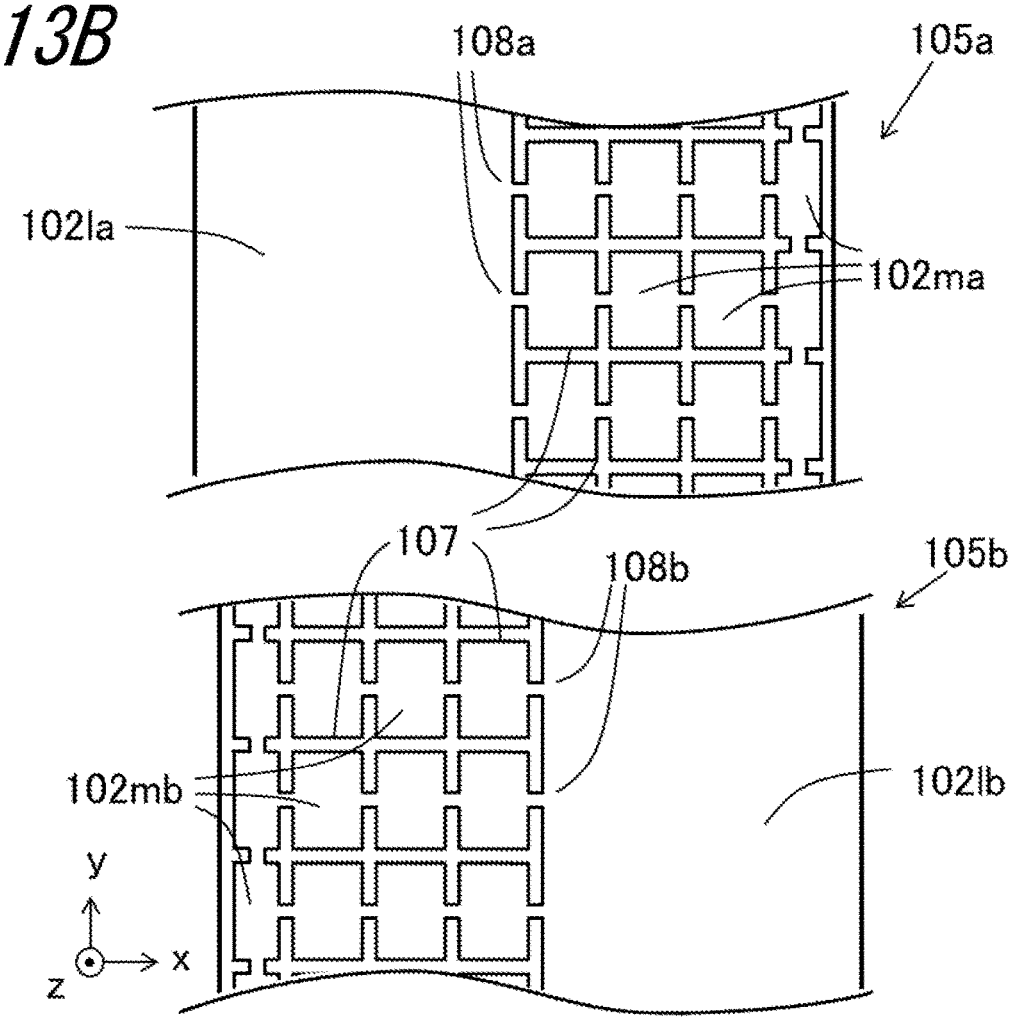

In a conventional film capacitor shown in FIGS. 13A and 13B described in Patent Literature 1, fuse portions 108a and 108b with high electric resistance concentrate in a specific portion (center) in the x direction of the main body portion 3, and thus there has been a problem that heat generation concentrates near the center and dielectric breakdown tends to occur.

In contrast, in the film capacitors A and B of the present embodiment, the third portion 2na and 2nb are overlapped with the dielectric film 1 interposed therebetween, and the grooves 7na and the grooves 7nb respectively extending in different directions intersect each other, so that the divided region 2nj are formed. Therefore, the fuse portions 108 do not concentrate in a specific portion, and concentration of heat generation due to self-recovery can be suppressed. In addition, there is also an advantage that components evaporated by the self-recovery tend to be evaporated to the outside through the grooves 7n in which the first grooves 7na and the second grooves 7nb are overlapped and formed into a mesh shape.

In the conventional film capacitor shown in FIGS. 13A and 13B, the fuse portions 108a and 108b overlap with each other over a plurality of layers of the metal film-attached films 105a and 105b, and thus there is a concern that the fuse portions 108 are blown at the same time.

In contrast, in the present embodiment, as shown in FIG. 7C, a first fuse portion 8na of the third portion 2na of the first metal film 2a and a second fuse portion 8nb of the third portion 2nb of the second metal film 2b can be disposed at positions which do not face each other with the dielectric film interposed therebetween. When the metal films 2a and 2b overlapping each other with the dielectric film 1 interposed therebetween are viewed in a plan view, the first fuse portion 8na and the second fuse portion 8nb are disposed at positions not overlapping each other (positions in which the first fuse portion 8na and the second fuse portion 8nb do not face each other with the dielectric film 1 therebetween), and thus the positions of the fuse portions 8n can be distributed. By distributing the positions of the fuse portions 8n in this way, an effect of reducing heat generation can be improved. It should be noted that the third portions 2na and 2nb may not have the fuse portions 8na and 8nb. When the third portions 2na and 2nb have the fuse portions 8na and 8nb, the first groove 7na and the second groove 7nb may intersect at centers of their respective longitudinal directions, or they may intersect at positions other than the centers.

Here, the x direction which is a direction in which the first end and the second end are disposed is defined as a third direction. As shown in FIG. 3B, a length of the third portion 2n (2na, 2nb) in the third direction (x direction) is defined as W3, and a length between a pair of opposing end surfaces located in the third direction (x direction) of the dielectric film 1 (length in the x direction of the dielectric film 1) is defined as W0. As to the length W3 of each of the third portions 2na and 2nb of the first metal film 2a and the second metal film 2b, a ratio of W3 to W0 (W3/W0) is set to 0.2 to 0.5. When W3/W0 is set to 0.2 or more, an effect of suppressing heat generation can be obtained, and when W3/W0 is set to 0.5 or less, an effect of suppressing capacitance reduction can be obtained.

In FIGS. 4 and 7A to 7C, the first direction OA and the second direction OB each make an angle of 45° with the third direction (x direction), and the first direction OA and the second direction OB intersect at right angles. Hereinafter, the first direction OA is simply referred to as the OA and the second direction OB is simply referred to as the OB in some cases.

Figure 8A:
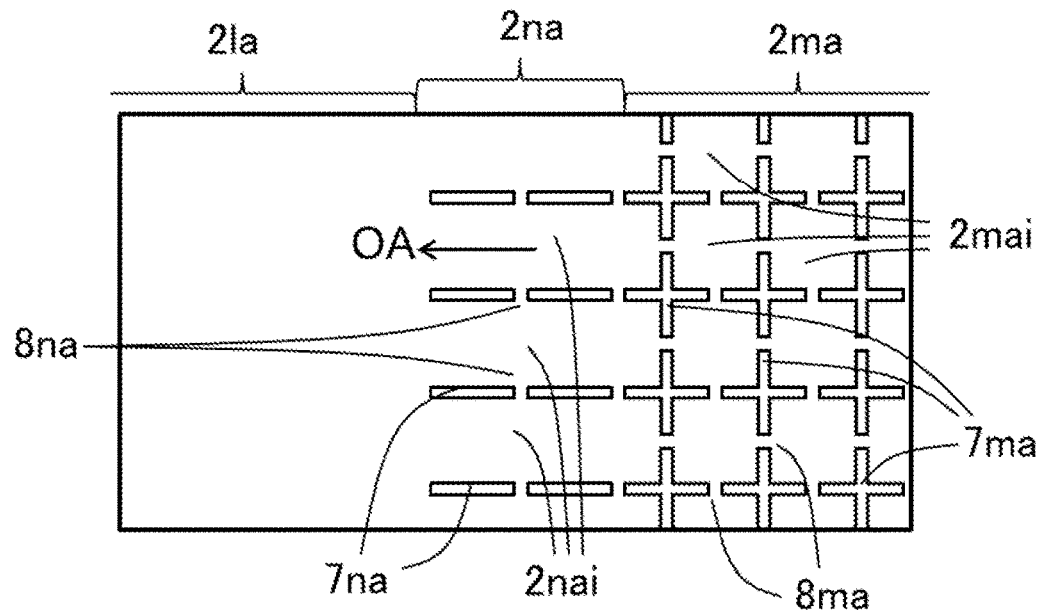
Figure 8B:
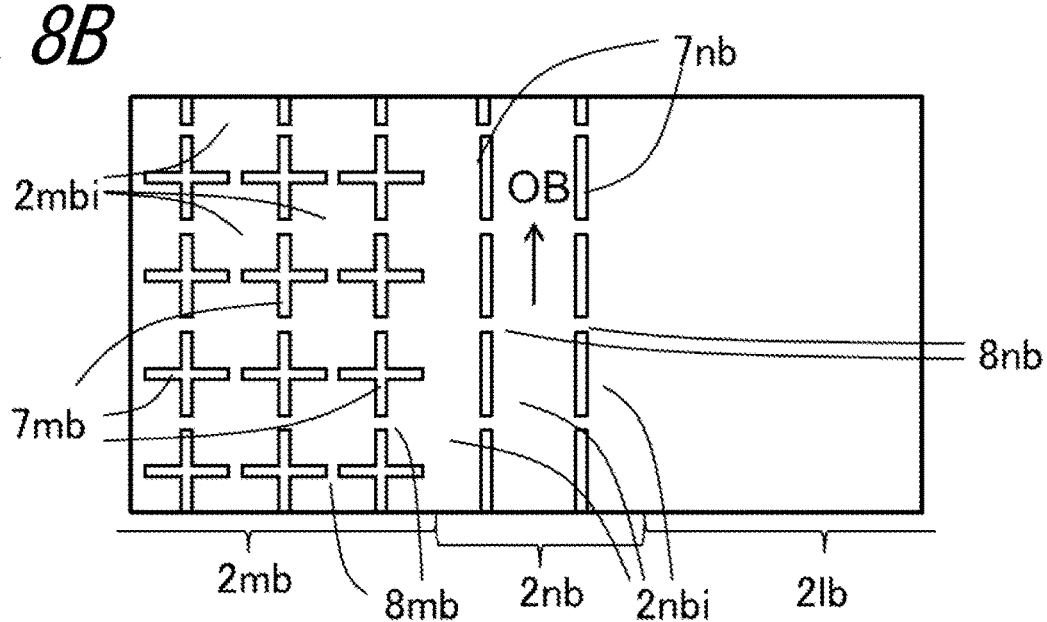
Figure 8C:
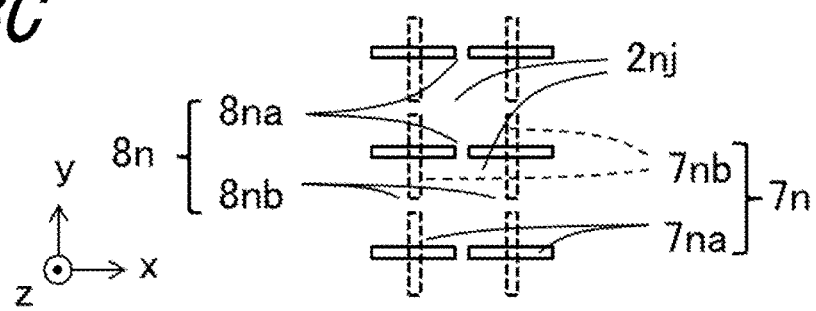
Figure 9A:
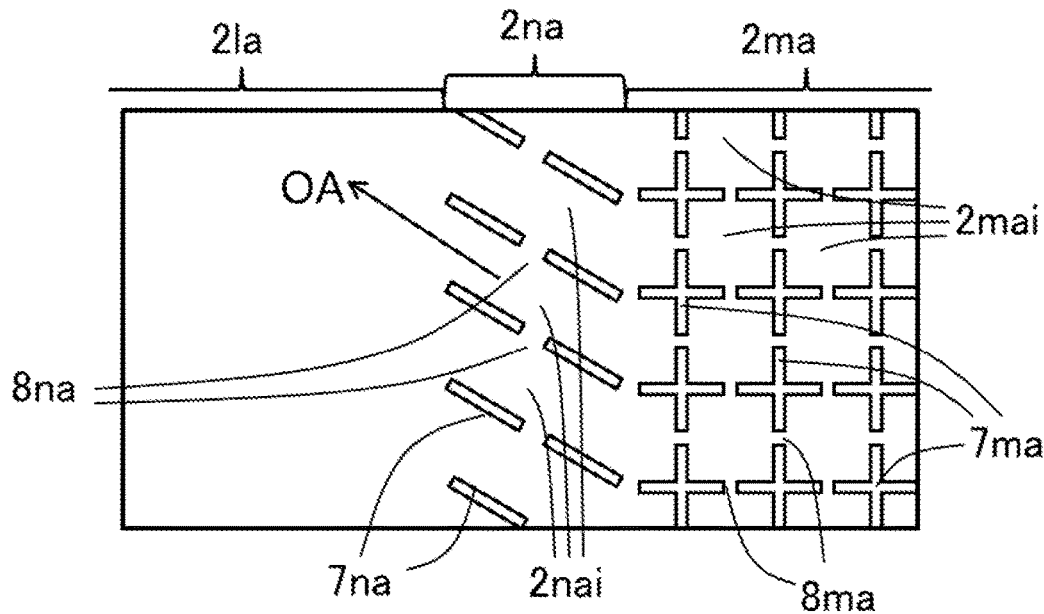
Figure 9B:
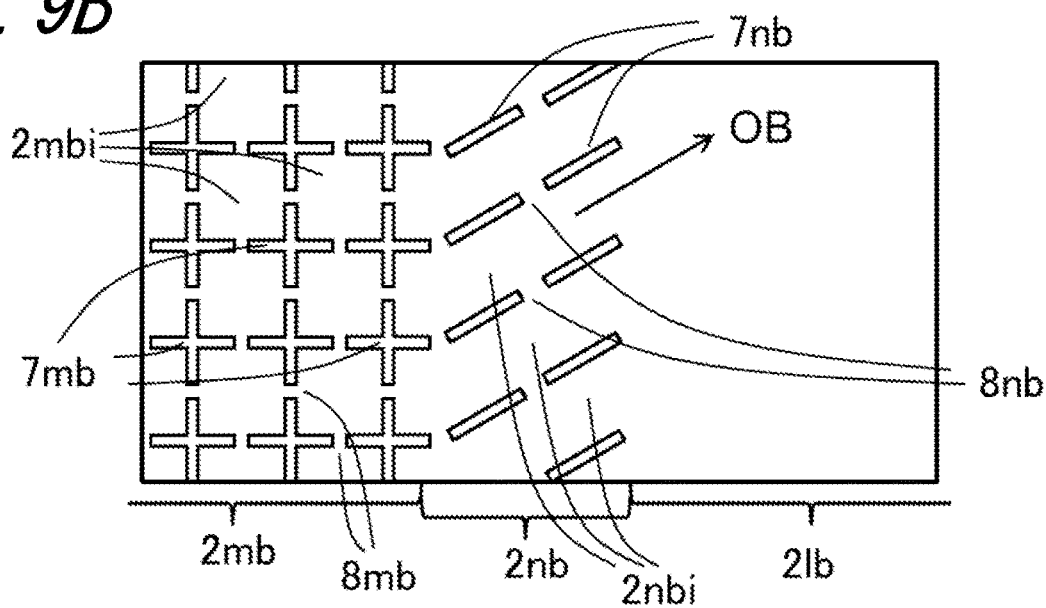
Figure 9C:
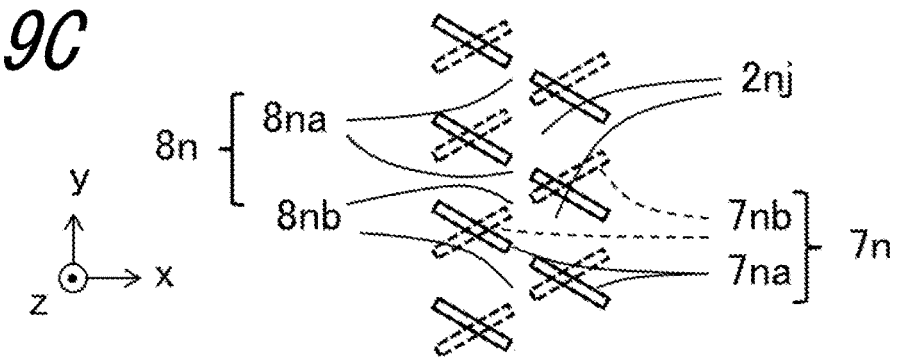

FIGS. 8A to 8C show another embodiment, the OA is the same as the third direction (x direction), and the OB is the same as the y direction perpendicular to the third direction. FIGS. 9A to 9C show still another embodiment, the OA and the OB each make an angle of 30° with the third direction (x direction), and the OA and the OB intersect each other.

It is to be noted that the OA and the OB are set so that the first groove 7na and the second groove 7nb intersect each other when the dielectric film 1, the first metal film, and the second metal film are viewed in a plan view, and for example, the angle formed by the OA with the third direction (x direction) and the angle formed by the OB with the third direction (x direction) may be the same with each other, or may be different from each other.

At least one of the first direction OA in which the first groove 7na extends and the second direction OB in which the second groove 7nb extends may make an angle of 10 to 80° with the third direction (x direction). At least one of the OA and the OB makes a predetermined angle with a longitudinal direction (y direction) of the dielectric film 1, so that entrainment of air can be suppressed and occurrence of wrinkles can be suppressed when the metal film-attached films 5a and 5b are laminated or wound to form the main body portion 3.

As shown in FIG. 3B, FIG. 4 and the like, the second portion 2m of the metal film 2 may include a third divided region 2mi, and a third fuse portion 8m connecting the third divided regions 2mi. The third divided regions 2mi are divided by an intermittent mesh-like (lattice-like) third groove 7m. The third divided regions 2mi and the third fuse portions 8m can be formed by laser processing.

When the second portion 2m has such third divided regions 2mi, and the third divided regions 2mi are connected via the third fuse portion 8m, the third fuse portion 8m around an insulation defect portion is blown by a short-circuit current at the time of self-recovery, and the insulation defect portion can be separated from an electric circuit. In addition, there is also an advantage that the components evaporated by the self-recovery tend to evaporate to the outside through the mesh-like (lattice-like) third groove 7m.

The direction in which the third groove 7m extends may be the same as the OA or the OB, or may be different from them. For example, in FIGS. 7A to 8C, the directions in which the third grooves 7ma and 7mb extend are identical with the OA and the OB, respectively. Further, in FIGS. 9A to 9C, the directions in which the third grooves 7ma and 7mb extend are not identical with either the OA or the OB.

The direction in which the third groove 7m extends may make an angle of 10 to 80° with the third direction (x direction) of the dielectric film 1. The direction in which the third groove 7m extends makes a predetermined angle with the third direction (x direction) of the dielectric film 1, so that entrainment of air can be prevented and occurrence of wrinkles can be suppressed when the metal film-attached films 5a and 5b are laminated or wound to form the main body portion 3.

The first portion 2l of the metal film 2 may not have a groove. Since the first portion 2l connected to the external electrode 4 is continuous without a groove, an equivalent series resistance (ESR) of the film capacitors A and B is reduced. Note that the first portion 2l may have a groove in the third direction (x direction). Particularly in the wound type film capacitor B, when the first portion 2l has a groove, it is preferable to dispose grooves in the y direction (a circumferential direction of winding) at a longer interval than a winding circumferential length. By having such grooves, the components evaporated by the self-recovery further tend to evaporate to the outside.

Further, the metal film 2 (2a, 2b) may have a heavy edge structure as shown in FIG. 3B and FIG. 6. Hereinafter, a vicinity 2f of the connecting portion of the metal film 2 to the external electrode 4 may also be referred to as a heavy edge portion 2f. The heavy edge structure is a structure in which the resistance of the metal film 2 in the vicinity 2f of the connecting portion to the external electrode 4 is lower than that of an effective region where the metal films 2a and 2b overlap each other. The heavy edge portion 2f is provided at the first portion 2l.

The thickness of the metal film 2 is preferably, for example, 20 nm or less, particularly preferably 5 to 15 nm in the effective region (region where a capacitance is formed). When the metal film 2 has such a thickness, an area resistance (a sheet resistance) of the metal film 2 is 18 to 50 $\Omega$/square, and the self-recovery can be obtained. The thickness of the metal film 2 in the vicinity 2f (heavy edge portion 2f) of the connecting portion to the external electrode 4 is preferably 2 to 4 times the effective region, that is, in a range of 10 to 80 nm.

Examples of an insulating resin material used for the dielectric film 1 include polypropylene (PP), polyethylene terephthalate (PET), polyphenylene sulfide (PPS), polyethylene naphthalate (PEN), polyarylate (PAR), polyphenylene ether (PPE), polyetherimide (PEI), and cycloolefin polymer (COP). Polyarylate (PAR) is particularly preferable because of a high dielectric breakdown voltage.

Such a film capacitor may be, for example, produced as follows. First, the dielectric film 1 is prepared. The dielectric film 1 is, for example, obtained by forming a resin solution in which an insulating resin is dissolved in a solvent into a sheet on a surface of a base material made of, for example, polyethylene terephthalate (PET), and by drying to volatilize the solvent. A forming method can be appropriately selected from well-known film forming methods such as a doctor blade method, a die coater method and a knife coater method. As the solvent used for forming, for example, methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethylacetamide, cyclohexane, or an organic solvent containing a mixture of two or more selected from them is preferably used. Further, a resin film produced by a melt extrusion method may be stretched.

The thickness of the dielectric film 1 may be, for example, 5 μm or less, but it is particularly preferable to use the dielectric film 1 having a thickness of 0.5 to 4 μm.

The dielectric film 1 may be composed of only the insulating resin described above, but may contain other materials. Examples of a constituent element other than the resin contained in the dielectric film 1 include the above-described organic solvents and inorganic fillers. As the inorganic filler, for example, inorganic oxides such as alumina, titanium oxide, silicon dioxide, inorganic nitrides such as silicon nitride, glass or the like can be used. Particularly when a material having a high dielectric constant, such as a complex oxide having a perovskite structure, is used as the inorganic filler, a relative permittivity of the entire dielectric film 1 is improved and the film capacitor can be miniaturized. In order to improve compatibility between the inorganic filler and the resin, surface treatment such as silane coupling treatment or titanate coupling treatment may be performed on the inorganic filler.

When such an inorganic filler is used for the dielectric film 1, by producing the composite film containing less than 50 mass % of the inorganic filler and 50 mass % or more of the resin, it is possible to obtain effects such as improvement of the relative permittivity by the inorganic filler while maintaining flexibility of the resin. Further, a size (an average particle diameter) of the inorganic filler is preferably 4 to 1000 nm.

After masking one of ends in the width direction (x direction) on one surface of the produced dielectric film 1, a metal component such as aluminum (Al) is evaporated to form a metal film 2, so that the metal film-attached film 5 is produced.

When the heavy edge structure is formed, a portion other than the portion (2f) forming the heavy edge of the metal film-attached film 5 are masked, and for example zinc (Zn) is further deposited on the above-described mask-free portion of the deposited metal component to form the heavy edge structure. In this case, the thickness of the film deposited as the heavy edge portion 2f is set to be 1 to 3 times the thickness of the above-described deposited metal component.

A groove 7n is formed in the third portion 2n of the metal film 2. At this time, the mesh-like (lattice-like) third groove 7m may be simultaneously formed in the second portion 2m as needed. A laser marker or a laser trimmer capable of blowing off a metal evaporated film is used for forming the grooves 7. One of green laser, YAG laser and $CO_2$ laser may be used as a laser. Note that it is also possible to form the groove 7 by masking a pattern of the groove 7 on the first surface 1c of the dielectric film 1 and depositing the metal component thereon.

Figure 5B:
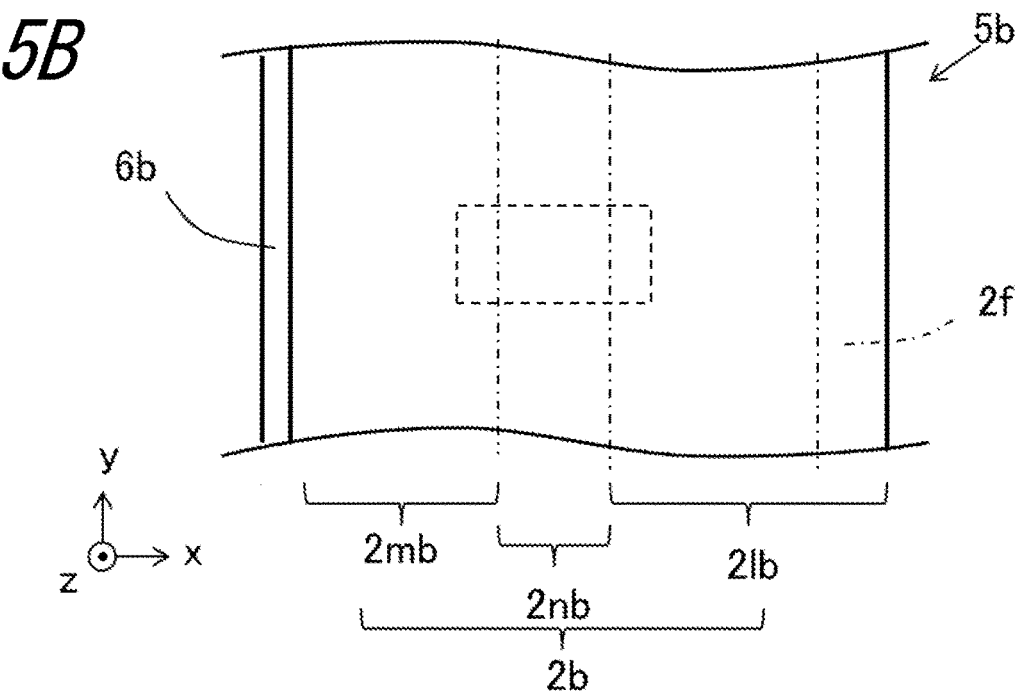

The metal film-attached films 5 (5a, 5b) having the metal films 2 (2a, 2b) on one surface thereof are overlapped with each other as a set of 2 sheets slightly shifted in the width direction (x direction) as shown in FIGS. 5A and 5B, and are laminated or wound as shown in FIGS. 1 and 2 to obtain the main body portion 3.

The film capacitors A and B are obtained by forming metallikon electrodes as the external electrodes 4 on both end surfaces of the obtained main body 3. For forming the external electrode 4, for example, metal spraying, sputtering, plating or the like is suitable.

Then, a surface of the main body portion 3 on which the external electrode 4 is formed can be covered with an exterior member (not shown) as needed.

Examples of a material of the metal film 2 include a metal such as aluminum (Al) or zinc (Zn) and an alloy.

Further, as a material of the metallikon electrode, at least one metallic material selected from zinc, aluminum, copper and solder is suitable.

Figure 10:
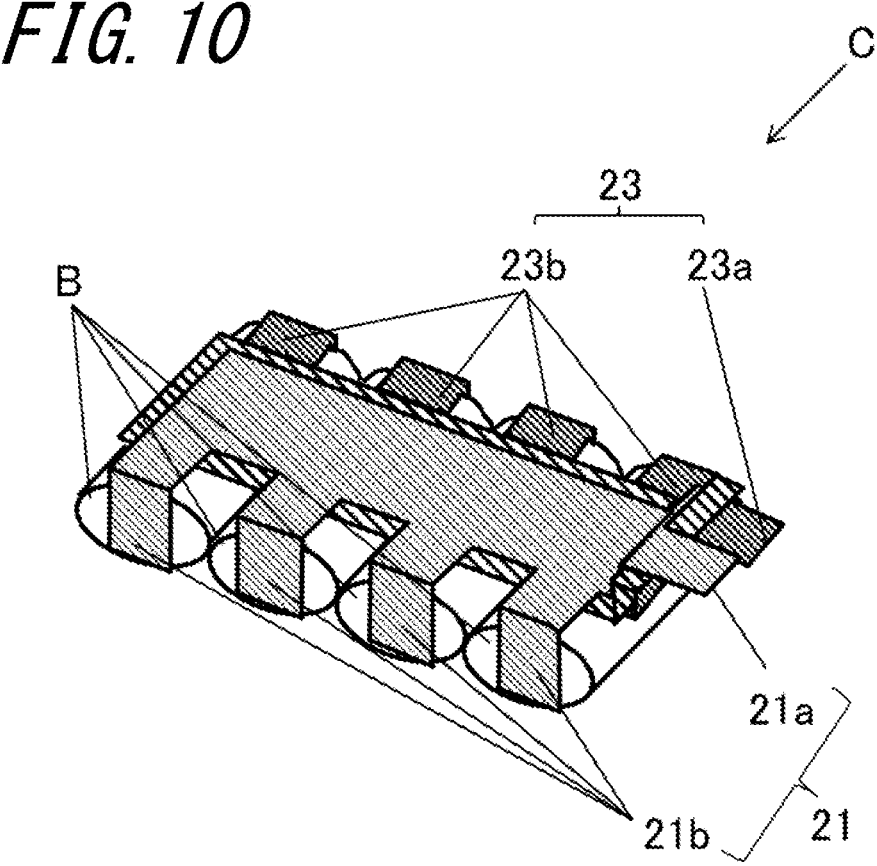
FIG. 10 is a perspective view schematically showing a structure of a combination type capacitor.

FIG. 10 is a perspective view schematically showing a structure of an embodiment of a combination type capacitor. In FIG. 10, in order to facilitate understanding of the structure, description of a case and a resin for molding is omitted. A combination type capacitor C of the present embodiment is configured such that a plurality of film capacitors B are connected in parallel via a pair of bus bars 21, 23. The bus bars 21 and 23 include external connection terminal portions 21a and 23a and lead terminal portions 21b and 23b which are respectively connected to the external electrodes 4a and 4b of the film capacitor B.

When the above-described film capacitor B is applied to the combination type capacitor C, it is possible to obtain the combination type capacitor C having an excellent self-recovery property. Note that the film capacitor A may be used instead of the film capacitor B.

The combination type capacitor C can be obtained by attaching the bus bars 21 and 23 to the external electrodes 4a and 4b which are respectively formed on both ends of a main body portion 3 via a bonding material in a state where a plurality of (four in the present embodiment) film capacitors B are juxtaposed.

The film capacitor B or the combination type capacitor C may also be formed into a resin-molded (case-molded) capacitor by housing the film capacitor B or the combination type capacitor C in a case and then filling a space in the case with the resin.

The combination type capacitor C shown in FIG. 10 is the capacitor in which the film capacitors B are juxtaposed in a direction of a long diameter of a cross-section perpendicular to a winding axis thereof, however, as another structure, the film capacitors B may be stacked in a direction of a short diameter of the cross-section perpendicular to the winding axis thereof.

Figure 11:
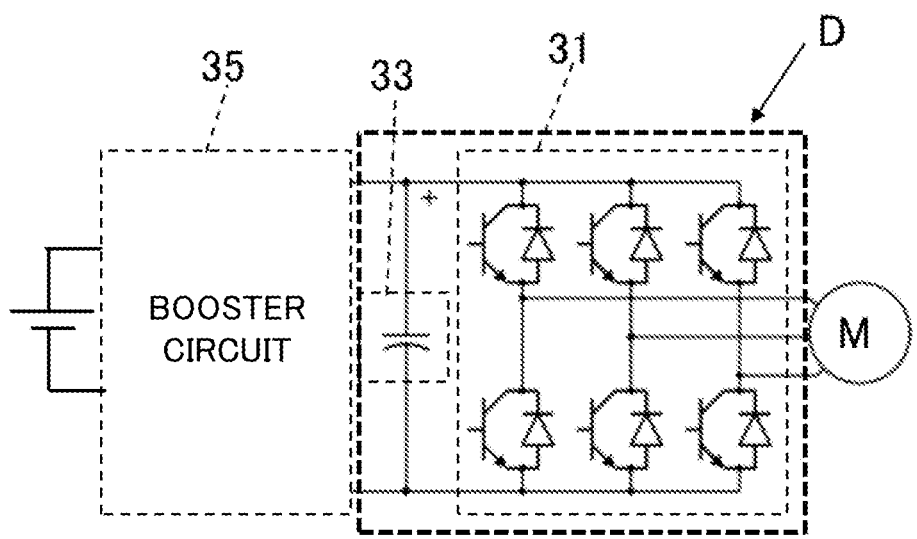
FIG. 11 is a schematic structural diagram for explaining a structure of an embodiment of an inverter.

FIG. 11 is a schematic structural diagram for explaining a structure of an embodiment of an inverter. FIG. 11 shows an example of an inverter D which creates an alternating current from a direct current. As shown in FIG. 11, the inverter D of the present embodiment includes a bridge circuit 31 including switching elements (for example, IGBT (Insulated Gate Bipolar Transistor)) and diodes, and a capacitance member 33 disposed between input terminals of the bridge circuit 31 for voltage stabilization. Here, the film capacitor A or B, or the combination type capacitor C described above is used as the capacitance member 33.

The inverter D is connected to a booster circuit 35 for boosting a voltage of a DC power supply. On the other hand, the bridge circuit 31 is connected to a motor generator (motor M) which is a drive source.

Figure 12:
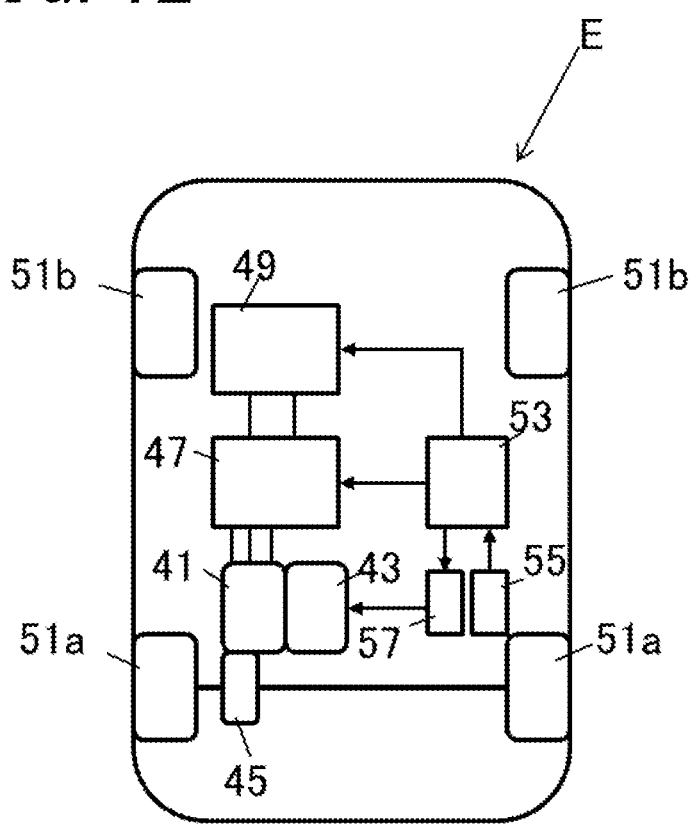
FIG. 12 is a schematic structural diagram showing an embodiment of an electric vehicle.

FIG. 12 is a schematic structural diagram showing an embodiment of an electric vehicle. FIG. 12 shows an example of a hybrid electric vehicle (HEV) serving as an electric vehicle E.

In FIG. 12, reference numeral 41 denotes a driving motor, reference numeral 43 denotes an engine, reference numeral 45 denotes a transmission, reference numeral 47 denotes an inverter, reference numeral 49 denotes a power supply (battery), and reference numerals 51a and 51b denote a front wheel and a rear wheel, respectively.

The electric vehicle E has a function of transmitting an output of the motor 41, the engine 43 or both of them serving as the drive source to the pair of left and right front wheels 51a via the transmission 45. The power supply 49 is connected to the motor 41 via the inverter 47.

The electric vehicle E shown in FIG. 12 is provided with a vehicle ECU 53 which performs comprehensive control of the entire electric vehicle E. Drive signals corresponding to the operation by a driver or the like from the electric vehicle E such as an ignition key 55, an accelerator pedal or a brake (not shown) are inputted to the vehicle ECU 53. The vehicle ECU 53 outputs instruction signals to the engine ECU 57, the power supply 49, and the inverter 47 serving as a load based on the drive signals. The engine ECU 57 controls a rotation speed of the engine 43 in response to the instruction signals to drive the electric vehicle E.

When the inverter D which uses the film capacitor A or B, or the combination type capacitor C of the present embodiment as the capacitance portion 33 is mounted on, for example, the electric vehicle E as shown in FIG. 12, since the film capacitor A or B, or the combination type capacitor C has the excellent self-recovery property, it is possible to maintain electrostatic capacitance for a long period of time, thereby reducing switching noise generated in the inverter 47 and the like for a long time.

The inverter D of the present embodiment can be applied not only to the above-described hybrid electric vehicle (HEV) but also to various power conversion application products such as the electric vehicle (EV), a fuel cell vehicle, an electric bicycle, a generator, or a solar battery.

Examples

The dielectric film having an average thickness of 2.5 μm was prepared using polyarylate (U-100, manufactured by UNITIKA). The dielectric film was formed into a sheet shape by dissolving polyarylate in toluene and coating it on a base material of a polyethylene terephthalate (PET) using a coater. After forming, the sheet was heated at 130° C. to remove toluene and obtain the dielectric film.

(Wound Type Film Capacitor)

The obtained dielectric film was peeled from the base material, and slit-processed over a width of 130 mm, and then an Al (aluminum) metal film with a width of 97 mm was formed on one main surface of the dielectric film. The Al metal film was formed by a vacuum evaporation method using a metal mask. The sheet resistance of the metal film was evaluated by a four-terminal resistance measurement mode using a multimeter, and as a result, the sheet resistance of the metal film was 50 Ω/square.

Using a green laser marker, a mesh pattern (see FIG. 4) was formed in a region to be the second portion of the metal film, and a pattern to be the first groove and the second groove was formed in a region to be the third portion of the metal film. Note that the first direction in which the first groove extends and the second direction in which the second groove extends are both the same as any one of the directions in which the third grooves forming the mesh pattern in the second portion extend. Further, as Comparative Example, a pattern in which the first portion and the second portion are directly adjacent without the third portion was also produced.

Laser irradiation conditions were output 4 W, frequency 140 kHz, and scan speed 4 m/s. The mesh pattern in the second portion was a pattern constituted by the third divided regions of 2 mm×2 mm and the third fuse portions of a width 0.4 mm connecting the third divided regions.

The metal film-attached film of 130 mm width was further slit-processed to form the metal film-attached film of 50 mm width having the insulation margin portion (a metal film-free portion in which the dielectric film is exposed) of 1.5 mm. In the metal film-attached film of Examples, the first portion located at one end in the width direction, the second portion adjacent to the insulation margin portion located at the other end, and the third portion located between the first portion and the second portion are disposed. The length W3 in the width direction of the third portion was set so that the ratio of the length W3 to the width W0 (W3/W0) of the metal film-attached film (dielectric film) is 0.5, 0.3 or 0.25. Hereinafter, a case where W3/W0 is 0.5 is referred to as Example 1, a case where W3/W0 is 0.3 is referred to as Example 2, and a case where W3/W0 is 0.25 is referred to as Example 3.

In the metal film-attached film of Comparative Example, the first portion located at one end in the width direction and the second portion adjacent to the insulation margin portion located at the other end were disposed to be adjacent to each other at a center of the metal film-attached film.

In Examples and Comparative Example, the width W1 of the first portion and the width W2 of the second portion were set to be equal.

A column formed of polypropylene (PP) having an outer diameter of 5 mm and a length of 50 mm was used as a winding core. A pair of metal film-attached films having a width of 50 mm was overlapped so that the metal films faced each other with the dielectric film interposed therebetween and wound around the winding core to produce a wound body. Note that the pair of metal film-attached films were wound in a state where they were offset from each other by 0.5 mm in the width direction (x direction) and the insulation margin portions were respectively disposed on different sides in the width direction (x direction), to obtain the wound body (main body portion). The number of winding was 50 times. In Examples, the first groove in the third portion of one of the pair of metal film-attached films and the second groove in the third portion of the other of the pair of metal film-attached films were disposed so as to intersect each other.

An alloy of zinc and tin was thermally sprayed on opposing end surfaces of the wound body (main body portion) in which the metal film was exposed, to form the metallikon electrodes which are the external electrodes to obtain the film capacitor.

(Evaluation)

The electrostatic capacitance of the manufactured film capacitor was measured under conditions of 1 V AC and 1 kHz using an LCR meter. The electrostatic capacitance was 20 μF in all Examples and Comparative example.

Heat generation state and capacitance reduction rate of the film capacitor were evaluated as follows. As for the heat generation state, a signal in which a sinusoidal wave of 10 kHz output by a function generator is amplified to a current of 100 A with a bipolar power supply was applied to the film capacitor with an initial temperature of 105° C., and a temperature thereof after about 1 hour when a surface temperature thereof was saturated was measured and compared with the initial temperature (105° C.). As for the capacitance reduction rate, after DC voltage of 1200 V was applied to the film capacitor at room temperature for 120 seconds using an insulation resistance meter, the electrostatic capacitance was measured under conditions of 1 V AC and 1 kHz using the LCR meter and was compared with the initial electrostatic capacitance (20 μF).

Temperature rise due to current application was 15° C. in Comparative Example not having the third portion, however, it was 8° C. in Example 1 (W3/W0=0.5), it was 10° C. in Example 2 (W3/W0=0.3), it was 12° C. in Example 3 (W3/W0=0.25), and it was confirmed that the heat generation was suppressed by having the third portion. This is probably because the fuse portions were distributed in the axial length direction by the third portion, and concentration of heat generation was suppressed.

The capacitance reduction rate after applying the DC voltage was 15% in Comparative Example not having the third portion, however, it was 12% in Example 1 (W3/W0=0.5), it was 5% in Example 2 (W3/W0=0.3), it was 8% in Example 3 (W3/W0=0.25), and it was confirmed that the capacitance reduction was suppressed by having the third portion.

REFERENCE SIGNS LIST

A: Laminated type film capacitor
B: Wound type film capacitor
C: Combination type capacitor
D: Inverter
E: Electric vehicle
1, 1a, 1b: Dielectric film
2, 2a, 2b: Metal film
2l, 2la, 2lb: First portion of metal film
2m, 2ma, 2mb: Second portion of metal film
2n, 2na, 2nb: Third portion of metal film
3: Main body portion
3a: First end of main body portion
3b: Second end of main body portion
4, 4a, 4b: External electrode
5, 5a, 5b: Metal film-attached film
7: Groove
8: Fuse portion
21, 23: Bus bar
31: Bridge circuit
33: Capacitance member
35: Booster circuit
41: Motor
43: Engine
45: Transmission
47: Inverter
49: Power supply
51a: Front wheel
51b: Rear wheel
53: Vehicle ECU
55: Ignition key
57: Engine ECU

The invention claimed is:

1. A film capacitor, comprising:
a main body portion comprising a dielectric film, and a first metal film and a second metal film which are respectively disposed on opposing first and second surfaces of the dielectric film; and
a first external electrode and a second external electrode which are respectively disposed at opposing first and second ends of the main body portion,
the first metal film and the second metal film each comprising a first portion, a second portion and a third portion,
the first portion of the first metal film being connected to the first external electrode at the first end, the second portion of the first metal film being located at the second end, the third portion of the first metal film being located between the first portion and the second portion, the third portion of the first metal film comprising a plurality of first divided regions which are divided by a first groove extending in a first direction,
the first portion of the second metal film being connected to the second external electrode at the second end, the second portion of the second metal film being located at the first end, the third portion of the second metal film being located between the first portion and the second portion, the third portion of the second metal film comprising a plurality of second divided regions which are divided by a second groove extending in a second direction,
the first direction and the second direction intersecting each other in a plan view of the film capacitor.

2. The film capacitor according to claim 1, wherein
the third portion of the first metal film comprises a first fuse portion connecting first divided regions adjacent to each other,
the third portion of the second metal film comprises a second fuse portion connecting second divided regions adjacent to each other, and
the first fuse portion and the second fuse portion are disposed at positions which do not face each other with the dielectric film interposed therebetween.

3. The film capacitor according to claim 1, wherein
when a direction in which the first end and the second end are arranged is defined as a third direction,
a ratio of W3 to W0 (W3/W0) is 0.2 to 0.5, where W0 denotes a distance between a pair of opposing end surfaces located in the third direction of the dielectric film, and W3 denotes a length in the third direction of the third portion.

4. The film capacitor according to claim 1, wherein
when a direction in which the first end and the second end are arranged is defined as a third direction,
the first direction and the second direction each make an angle of 10 to 80° with the third direction.

5. The film capacitor according to claim 1, wherein
the second portion of the first metal film and the second portion of the second metal film each comprise a plurality of third divided regions which are divided by an intermittent mesh-like third groove, and a third fuse portion connecting the third divided regions.

6. A combination type capacitor, comprising:
a plurality of film capacitors; and
at least one bus bar connecting all of the plurality of film capacitors,
the plurality of film capacitors including the film capacitor according to claim 1.

7. An inverter, comprising:
a bridge circuit comprising switching elements; and
a capacitance member connected to the bridge circuit,
the capacitance member comprising the film capacitor according to claim 1.

8. An inverter, comprising:
a bridge circuit comprising switching elements; and
a capacitance member connected to the bridge circuit,
the capacitance member comprising the combination type capacitor according to claim 6.

9. An electric vehicle, comprising:
a power supply;
an inverter connected to the power supply;
a motor connected to the inverter; and
a wheel driven by the motor,
the inverter comprising the inverter according to claim 7.

10. An electric vehicle, comprising:
a power supply;
an inverter connected to the power supply;
a motor connected to the inverter; and
a wheel driven by the motor,
the inverter comprising the inverter according to claim 8.

* * * * *